Oct. 10, 1939.  E. L. CHAFFEE  2,175,682
BOTTLING APPARATUS
Filed July 12, 1937  2 Sheets-Sheet 1
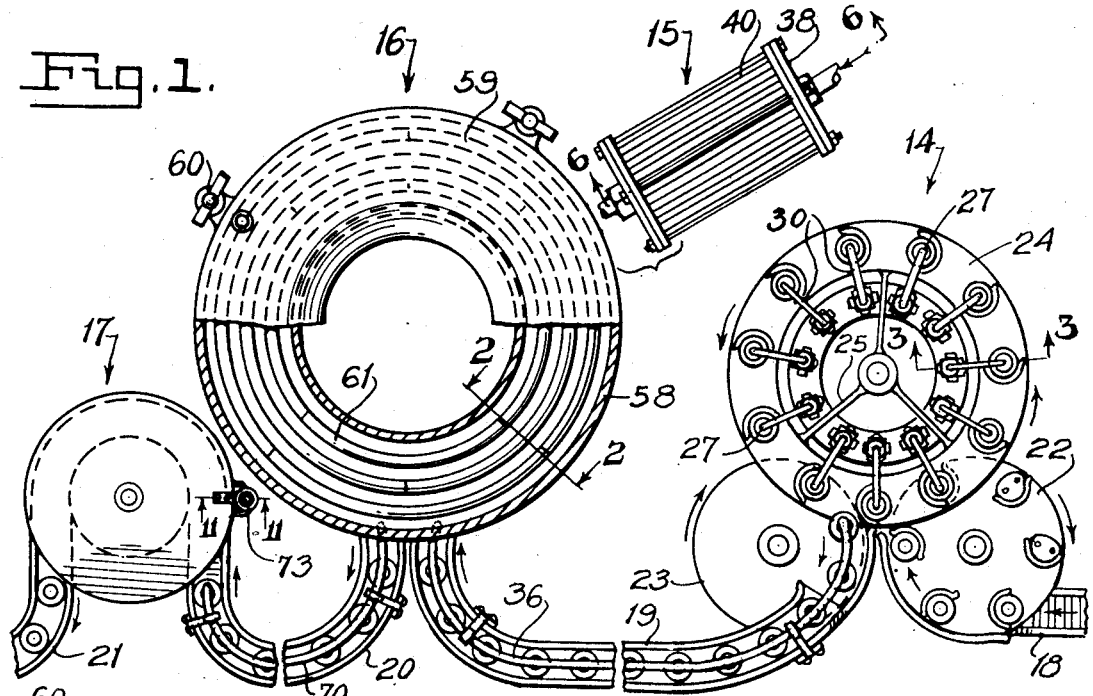
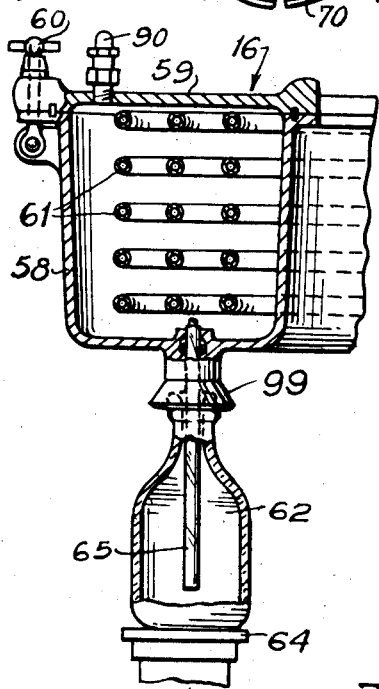
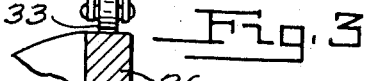
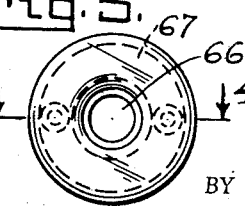
INVENTOR.
E. L. Chaffee
BY Carlos G. Stratton
ATTORNEY Oct. 10, 1939.                E. L. CHAFFEE                2,175,682
                           BOTTLING APPARATUS
                         Filed July 12, 1937            2 Sheets-Sheet 2
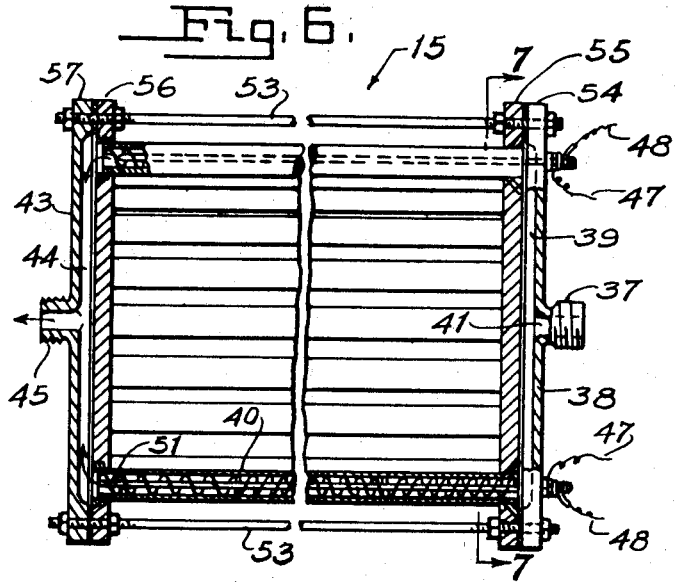
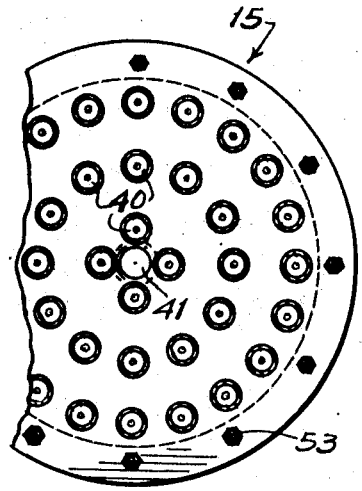
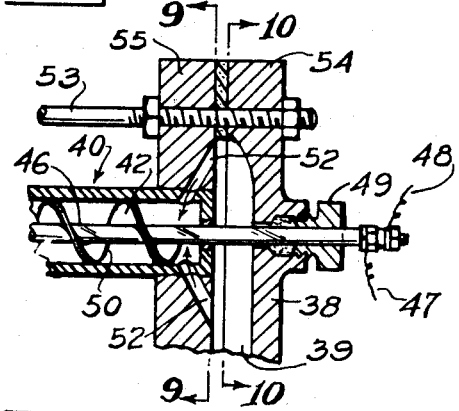
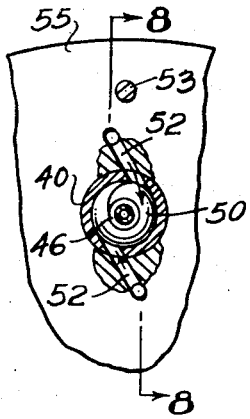
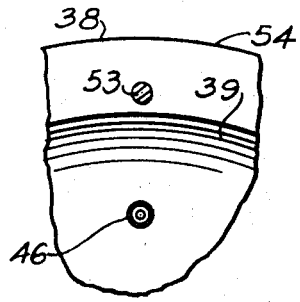
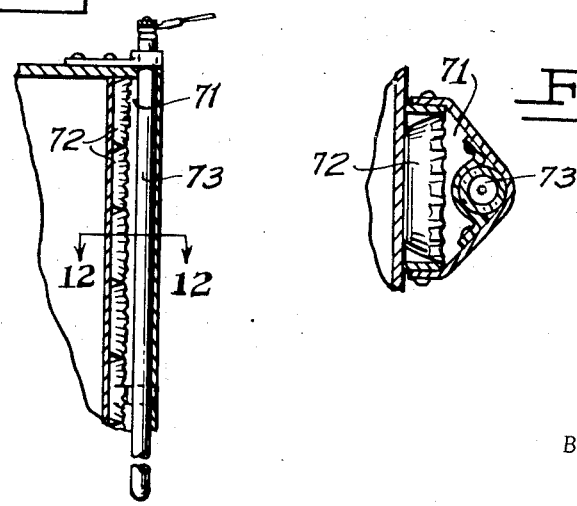
INVENTOR.
E. L. Chaffee
BY Carlos G. Stratton
ATTORNEY.

Patented Oct. 10, 1939

2,175,682

UNITED STATES PATENT OFFICE 2,175,682

BOTTLING APPARATUS

Edmund Lyman Chaffee, Arcadia, Calif.

Application July 12, 1937, Serial No. 153,207

9 Claims. (Cl. 226—68)

My invention relates to processes and apparatus for bottling bacteriologically pure beer without pasteurizing the beer. An object of the invention is to provide unpasteurized draught beer in bottles.

It is to be understood throughout this specification wherever "bottling," "bottled" or "bottles" is mentioned, that canning, canned or cans is to be included thereby, for while the embodiment shown and described is primarily adapted for bottles, the process is adapted for beer in cans and the apparatus may be adapted to fill cans.

Another object is to sterilize the beer while under pressure, in order to retain the $CO_2$ gas in the beer.

A further object is to provide a turbulence or other movement of the beer while sterilizing same, in order to avoid stratification and faulty sterilization.

Still another object is to sterilize the beer in the bottle filling device and to provide a sterilizing lamp for the bottle filling tube and thus sterilize the beer during its movement into the bottles.

Other objects reside in sterilizing the empty bottles before filling same, retaining the bottles in a sterile condition until they reach the filler, retaining the beer in the bottles in a sterile condition until capped and sterilizing the caps before application to the bottles.

The invention also comprises novel details of construction and novel combinations and arrangements of parts, which will more fully appear in the course of the following description.

In the drawings, like reference characters designate similar parts in the several views.

Figure 1 is a diagrammatic plan view, partly broken away, of an embodiment of the invention.

Figure 2 is an enlarged section taken on the line 2—2 of Figure 1.

Figure 3 is an enlarged broken section taken on the line 3—3 of Figure 1.

Figure 4 is a section taken on the line 4—4 of Figure 5.

Figure 5 is a bottom view of the filling tube, looking in the direction of the arrow A of Figure 4.

Figure 6 is an enlarged, broken section taken on the line 6—6 of Figure 1.

Figure 7 is a cross section taken on the line 7—7 of Figure 6.

Figure 8 is an enlarged, broken sectional detail of an element comprised in Figure 6.

Figures 9 and 10 are respectively sections taken on the lines 9—9 and 10—10 of Figure 8, looking in the directions of the arrows on the lines respectively.

Figure 11 is an enlarged section taken on the line 11—11 of Figure 1.

Figure 12 is a still further enlarged section, taken on the line 12—12 of Figure 11.

Referring more in detail to the drawings, the reference numbers 14, 15, 16 and 17 generally designate a bottle sterilizer, a beer sterilizer, a filler-beer sterilizer and a crowner, respectively.

An endless carrier 18 conveys washed empty bottles to the bottle sterilizer 14. An endless carrier 19 conveys sterilized bottles to the filler 16. An endless carrier 20 conveys bottles filled with sterilized beer to the crowner 17, and an endless carrier 21 conveys crowned bottles of sterilized beer from the crowner 17.

A star wheel 22 receives washed empty bottles from the conveyor 18 and feeds them into the bottle sterilizer 14. A rotating disc 23 receives sterilized bottles from the sterilizer 14 and passes them on to the conveyor 19. The star wheel and said disc rotate clockwise, as indicated by the arrows. The star wheel and disc are of conventional construction, so that further illustration and description are believed unnecessary to one skilled in the art.

The bottle sterilizer 14 comprises an annular, rotary table 24 mounted on a spider 25. In the opening within the annular table 24 is a circular cam 26. Disposed around and depending above the table 24 is a series of sterilizing lamps 27. These lamps are glass tubes containing vapor or gas and are connected in an electric circuit, as by wires 28 and 29 shown in Figure 3. These sterilizing lamps emit rays of predetermined wave length preferably at the ultra violet end of the spectrum.

Each lamp 27 is mounted on a vertically movable goose neck 30 above a bottle cup 31 on the table 24. Guides 32 on the table 24 direct the goose necks 30 in their vertical movements. Rollers 33 at the lower ends of the goose necks ride on the cam 26. An adjustable plate 34 held on the lamp by an elastic collar 134 limits the movement of the lamp 27 into the bottle 35.

The cam 24 maintains the lamps 27 in raised positions, as shown in full lines in Figure 3, at the point where bottles are fed on to the table 24 from the star wheel 22. After the bottles 35 are in position, the wheels 33 ride down the cam face, permitting the lamps to descend into the bottles, as suggested by broken lines in the bottle 35 in Figure 3.

During the period that the table is revolving a bottle from the star wheel 22 to the rotating disc 23, in the direction of the arrows of rotation of the table 24, the lamps in the empty bottles are emitting said rays, thus thoroughly sterilizing the bottles.

A bent lamp 36 along the conveyor 19 is directly above the open necks of the bottles during movement with the conveyor from the disc 23 to the filler 16, thus maintaining the bottles in their sterile condition and preventing contamination.

Beer is introduced through a nipple 37 into a header 38 on the beer sterilizer 15. The header 38 has a concavity 39 for distributing beer to a bank of sterilizing tubes 40. The inlet from the nipple 37 to the concavity 39 is shown at 41.

Each tube 40 comprises an aluminum tube 42 leading from the header 38 to another head 43 of similar construction, arranged to receive sterilized beer from the tubes 40 into a concavity 44 of the head 43 and in turn discharging the beer through a nipple 45 into the filler-sterilizer 16. The interior surface of the tubes 42 is preferably polished or plated, to produce a reflecting surface.

Within the tubes 42 sterilizing lamps 46 are disposed longitudinally. Wires 47 and 48 connect the lamps in an electric circuit. Packing glands 49 fasten the lamps in liquid tight relation to the header 38 and head 43.

Spirals 50 and 51 are arranged in the tubes 42 around the lamps 46. Preferably the spirals are right and left hand, at different sections. Thus the beer traversing the tubes will be stirred, thus creating a turbulence and sterilizing all the beer going therethrough and thus prevent stratification.

Substantially tangential passages 52 connect the concavities of the header 38 and head 43 with the interior of the tubes 42 around the lamps 46. Rods 53 clamp the header 38 and head 43 together and clamp together sections 54 and 55 of the header 38 and sections 56 and 57 of the head 43. Suitable gaskets are disposed between the sections.

Sterilized beer from the sterilizer 15 empties into an annular, rotary filler tank 58, which in operation is closed by a lid 59, which is clamped in place by suitable means 60.

Disposed within the tank 58 is a battery of annular sterilizing lamps 61, arranged in series vertically and horizontally. It is of course to be understood that they, and all other sterilizing lamps mentioned in this specification, are of the character described in connection with lamps 27. The lamps 61 also have suitable connections (not shown) for connecting same in an electric circuit. Thus it will be noted that the filler is itself a beer sterilizer.

To fill bottles 62 with beer, filling valves of any conventional construction may be employed. For the sake of clarity, the valves have been omitted, but it is to be understood that such valves control the flow through the filler tubes 65 respectively.

A vertically movable support 64 supports each bottle. As is understood in the art, the support 64 descends to receive a bottle and, after receiving it from the conveyor 19, rises to permit the filling tube 65 to be disposed within the bottle, as shown in Figure 2.

As soon as the counter pressure has been built up in the bottle, the beer valve is opened to admit beer to the bottle. Detailed illustration and description of same are deemed unnecessary since such mechanism per se is not part of the present invention and since any suitable means already known in the art may be used.

One feature that is claimed as part of the present invention is the filler tube 65, which comprises a central passage 66 surrounded by an annular glass enclosed chamber 67, which contains mercury vapor, as in the previous lamps. Wires 68 and 69 pass an electric current through the vapor in the chamber 67, thus causing the filler tube to emit sterilizing rays inward and outward. By this means, not only do the rays impinge upon beer descending in the passage 66 but also upon beer in the bottle, outside the filler tube. A cap 99 on the tank 58 limits inward movement of the tube 65 into the bottle 62.

Sterile bottles are supplied by the conveyor 19 to the filler 58, and it is believed clear without further illustration that the tank 58 is mounted to rotate and that there is a series of filler tubes around the tank on the under side thereof, whereby the bottles are filled through the sterilizing lamp tubes 65 as the tank 58 rotates. Moreover, the supports 64 revolve as the tank rotates.

Bottles filled with sterilized beer are discharged from the filler-sterilizer 16 on to the conveyor 20. A sterilizing lamp 70 follows the course of bottles on the conveyor 20, directly above the open necks of the filled bottles, whereby to maintain the sterile condition of the beer and the interior of the bottle necks.

The crowner 17 receives the open bottles of sterile beer from the conveyor 20. The crowner has a passage 71 down which move the crowns 72 for the bottles. Disposed lengthwise of the passage 71 and opposite the open faces of the crowns is a sterilizing lamp 73. Suitable electric connection is had for the lamp.

By this means, the inner faces of the caps are sterilized, in order that they may not contaminate the sterilized beer when applied to the bottles. Otherwise the crowner operates in a conventional manner. The conveyor 21 transports bottled beer from the crowner.

Due to the use of several elements, the operation of each has been described following the respective descriptions of them. It is believed that the function of each element is thereby made clearer, and this is especially of value in view of the fact that one element may be used separately; e. g., if desired the sterilizing lamps may be omitted from all elements except the tubes in the filler-sterilizer tank and its filler tubes. The operation of the system is believed clear from the foregoing.

A safety valve is suggested at 90 for the relief of pressure in the tank 59.

It is to be understood that there is a rotary, leak-proof fitting connecting the sterilizer 15 with the rotating filler-sterilizer 16. Details of such a fitting are known in the art, so that illustration and description of same are deemed unnecessary.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a bottle filling device, a rotating tank, sterilizing electric lamp means in the tank for sterilizing beer therein, a filler tube carrying an electric lamp sterilizing means, the tube being connected to receive beer from the tank and to direct it into bottles, and bottle supports mounted to revolve as the tank rotates, there being points at which the filling device receives empty bottles and at which filled bottles are discharged for sterile capping, after rotation of the tank.

2. In a bottle filling device, an annular rotating tank, a glass tube bent in annular form to follow generally the contour of the tank, vapor or gas in the tube adapted when activated to emit sterilizing rays, the tank having a discharge opening, a glass discharge tube having a chamber and having an adjacent passage connecting with the discharge opening, a body of vapor or gas in the chamber adapted when activated to emit sterilizing rays, and wires connecting with the tube and with the chamber to connect same in electric circuits for the purpose of passing electric currents through the vapor or gas in the tube and in the chamber, there being points at which the filling device receives empty bottles and at which filled bottles are discharged for sterile capping, after rotation of the tank.

3. In a bottle filling device, a rotating tank having a discharge outlet, a glass tube arranged to revolve with the rotation of the tank, the tube comprising an annular closed chamber and having a passage surrounded by the chamber, the passage connecting with the tank outlet, vapor or gas in the chamber adapted when activated to emit sterilizing rays, wires connecting with the chamber to connect same in an electric circuit for the purpose of passing an electric current through the vapor or gas in the chamber, the tube including said chamber being dimensioned to be admitted into the neck of a beer bottle, and rotating means to support bottles which receive the tubes therein.

4. A filling tube for a bottle filling machine, comprising a closed chamber which surrounds a passage but is not connected with the passage, means for connecting the passage with a beer tank, a body of vapor or gas in the chamber adapted when activated to emit sterilizing rays, the passage having a discharge outlet, an end of the chamber surrounding the discharge outlet and said end being insertable in the neck of a beer bottle, an electric circuit, and two connections connecting the chamber in the circuit, said conections being back from the discharge outlet and arranged to permit the insertion of the chamber into the bottle without inserting the connections therein.

5. A filling tube for a bottle filling machine, comprising a closed chamber which surrounds a passage but is not connected with the passage, means for connecting the passage with a beer tank, a body of vapor or gas in the chamber adapted when activated to emit sterilizing rays, the passage having a discharge outlet, an end of the chamber surrounding the discharge outlet and said end being insertable in the neck of a beer bottle, an electric circuit, and two connections at the opposite end of the chamber away from the discharge end, which connections together connect the chamber in the circuit.

6. The combination of a filling tube for a bottle filling machine, comprising a closed chamber which surrounds a passage but is not connected with the passage, means for connecting the passage with a beer tank, a body of vapor or gas in the chamber adapted when activated to emit sterilizing rays, the passage having a discharge outlet, an end of the chamber surrounding the discharge outlet and said end being insertable in the neck of a beer bottle, an electric circuit, two connections connecting the chamber in the circuit, said connections being back from the discharge outlet, and means to limit the inward movement of the chamber into the bottle, to prevent the connections entering the bottle.

7. In combination, a filler comprising a tank, sterilizing lamp means arranged to emit sterilizing rays into the tank, filler tubes to direct beer subjected to said rays from the tank into bottles, a conveyor to transmit filled bottles from the filler to a sterile crowner, and sterilizing lamp means following the course of bottles on said conveyor, the latter sterilizing lamp means being disposed to emit sterilizing rays into the necks of bottles on the conveyor until transmitted to the crowner.

8. In a bottle filling device, a rotating tank, a discharge conduit arranged to revolve with the rotation of the tank, the conduit having a chamber arranged adjacent the conduit passage, a body of vapor or gas in the chamber adapted when activated to emit sterilizing rays, wires connecting with the chamber to connect same in an electric circuit for the purpose of passing an electric current through the vapor or gas in the chamber, and rotating means to support bottles which receive the conduit and chamber therein.

9. In a filler having means to sterilize liquid discharged by the filler and having means to direct the sterile liquid into containers, a substantially horizontal conveyor to transmit substantially filled containers from said directing means to a sterile crowner, and sterilizing lamp means arranged along the course of the open ends of the containers as the containers are so transmitted by the conveyor, the lamp means being disposed to emit sterilizing rays into the open ends of the containers from said directing means to the crowner.

EDMUND LYMAN CHAFFEE.